Patented Nov. 29, 1949

2,489,463

UNITED STATES PATENT OFFICE 2,489,463

STABLE BLUE WRITING INK AND A DYE THEREFOR

William B. Reynolds, Cincinnati, Ohio, assignor to The Parker Pen Company, Janesville, Wis., a corporation of Wisconsin No Drawing. Application February 25, 1946, Serial No. 650,140

6 Claims. (Cl. 106—22)

This invention relates to blue azo dyes.

An object of the invention is to provide new azo dyes suited for use in aqueous alkaline inks, particularly alkaline inks for fountain pens, which dyes will, in such media, have a desirable clear blue color, will have adequate solubility in such media to impart a desirable color intensity thereto, and will have a higher order of stability in such media than is possessed by previously known blue dyes which were in other respects suited for such use.

Blue is, by far, the most popular color for writing inks. Blue dyes suitable for use in neutral or acid aqueous writing inks are known and widely used. It has become known that aqueous writting inks containing strong caustic alkalis have important advantages including quick drying by rapid penetration of the writing paper. However, no satisfactory blue dye has heretofore been found which has the required stability in such inks. One of the best previously known blue dyes for such use is Brilliant Benzo Blue 6 BA Ex. Conc. (Colour Index #518, Schulz 6th edition #510). However, it has only relative stability in aqueous inks containing caustic alkali and slowly breaks down to a very undesirable pale, dull color when so used.

The present invention comprises new azo dyes which have a desirable blue color, adequate solubility and a high order of stability in aqueous inks containing caustic alkali, rendering them eminently suited for use in alkaline aqueous writing inks. These new dyes have been prepared by tetrazotizing either 4,4'-diamino-stilbene-2,2'-disulfonic acid or 3,3'-dichlorobenzidine and coupling the same with two moles of either K-acid or SS-acid.

Example 1

1 mole of 4,4'-diaminostilbene-2,2'-disulfonic acid is stirred to a smooth slurry with 2,000 parts of water. To this slurry is added 5 moles of 10-N hydrochloric acid and the stirring is continued for one hour. The slurry is then diluted with 2,000 parts of water and iced to about 5° C. by the addition of 1,000 to 2,000 parts of ice. The diaminostilbene disulfonic acid is tetrazotized by the addition of 2 moles of sodium nitrite dissolved in 500 parts of water. An excess of nitrite, as indicated by starch-iodide test paper, is maintained for at least one hour prior to coupling.

The coupling solution is prepared by dissolving 2.02 moles of SS-acid (1-amino-8-naphthol-2,4-disulfonic acid) in 3,000 parts of water by the addition of 8 moles of sodium carbonate. The temperature of the solution is adjusted to 10° C. by the addition of ice. The tetrazo solution prepared above is run into the coupling solution over a period of one hour and the resultant solution is stirred for an additional two hours.

The disazo dyestuff is precipitated by the addition of sodium chloride, filtered, washed with brine solution and dried in an air-circulating oven at 60° C.

In the above example, K-acid (1-amino-8-naphthol-4,6-disulfonic acid) may be substituted for SS-acid.

Example 2

1 mole of 3,3'-dichlorobenzidine (m,m' dichlorobenzidine) is slurried with 1,000 parts of water and 5 moles of 10-N hydrochloric acid. The slurry is diluted by the addition of 3,000 parts of water and stirred for at least two hours. Ice (about 1500 parts) is added to lower the temperature to about 10° C. The dichlorobenzidine is tetrazotized by the rapid addition of 2 moles of sodium nitrite dissolved in 500 parts of water. The tetrazo solution is stirred for one hour with a definite excess of nitrite and is then clarified with activated carbon and filter-aid.

A coupling solution was prepared by dissolving 2.02 moles of K-acid (1-amino-8-naphthol-4,6-disulfonic acid) in 3,000 parts of water by the addition of 8 moles of sodium carbonate. The coupling reaction, isolation of the resulting dyestuff, and drying thereof all are carried out as in Example 1.

In Example 2, SS-acid (1-amino-8-naphthol-2,4-disulfonic acid) may be substituted for K-acid.

It is well known that coupling of a diazotized base to an 8-naphthol occurs predominantly in the 7 position and to a much lesser amount in the 5 position. Consequently, in the dyes resulting from the above examples, the couplings are predominantly in the 7 position on the 1-amino-8-naphthol-disulphonic acid groups. Such variation as may occur in relative amounts of couplings in the 7 and 5 positions is apparently without appreciable effect on the caustic alkali stability of the dyes.

Each of the four dyes obtained as above described produces intense bright blue color in aqueous caustic alkali solutions and has a high order of stability and permanence making it eminently suited for the production of quick drying, water-fast, blue alkaline writing inks. By way of example, such inks containing one or more of the new dyes of the present invention may be prepared in accordance with the following formula:

|  | Parts |
|---|---|
| Dyestuff of present invention | 1 |
| Ammonium vanadate | 0.35 |
| Caustic soda | 1.50 |
| Soft water | 100 |

The proportions may be varied.

A bright, blue, permanent ink is obtained which maintains its full color strength on storage for an indefinite period of time. It is contemplated that alkaline writing inks made with the above specified dyes are within the scope of my invention.

The numbering system employed in numbering the positions on the benzidine nucleus is that commonly used in standard texts such as "Organic Chemistry" by Paul Karrer, second English edition published 1946 by Elsevier Publishing Company, Inc., New York (see especially page 78).

I claim:

1. A blue dye stable in caustic alkali solution, said dye consisting at least predominantly of a compound of the structure

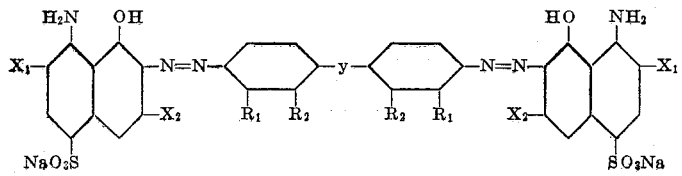

wherein $X_1$, is one member and $X_2$ the other member of the class consisting of H and $SO_3Na$, and $R_1$ is a member of the class consisting of H and Cl, and, when $R_1$ is H, $R_2$ is $SO_3Na$ and $y$ is

but, when $R_1$ is Cl, $R_2$ is H and $y$ is a single bond, said dye being obtained by coupling, in an alkaline solution, two molecular equivalents of a member of the class consisting of 1-amino-8-naphthol-2,4-disulphonic acid and 1-amino-8-naphthol-4-6-disulphonic acid with one molecular equivalent of a member of the class consisting of 4,4-diaminostilbene-2,2'-disulphonic acid and 3,3'-dichlorobenzidine.

2. A blue dye stable in caustic alkali solution, said dye consisting at least predominantly of a compound of the structure

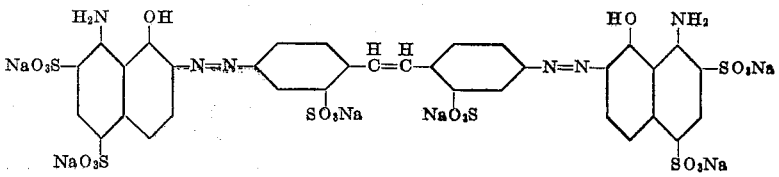

produced by coupling tetrazotized, 4,4'-diaminostilbene-2,2'-disulphonic acid two molecular molecular equivalent of 1-amino-8-naphthol-2,4-disulphonic acid.

3. A blue dye stable in caustic alkali solution, said dye consisting at least predominantly of a compound of the structure

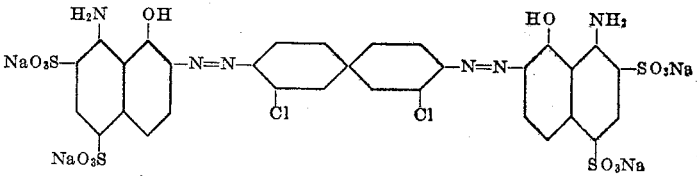

produced by coupling tetrazotized 3,3'-dichlorobenzidine with two molecular equivalents of 1-amino-8-naphthol-2,4-disulphonic acid.

4. A stable blue writing ink comprising an aqueous solution of a caustic alkali and the dye consisting at least predominantly of a compound of the structure

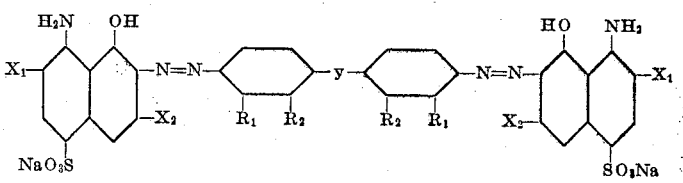

wherein $X_1$, is one member and $X_2$ the other member of the class consisting of H and $SO_3Na$, and $R_1$ is a member of the class consisting of H and Cl, and, when $R_1$ is H, $R_2$ is $SO_3Na$ and $y$ is

but, when $R_1$ is Cl, $R_2$ is H and $y$ is a single bond, which dye is obtained by coupling, in an alkaline solution, two molecular equivalents of a member of the class consisting of 1-amino-8-naphthol-2,4-disulphonic acid and 1-amino-8-naphthol-4,6-disulphonic acid with one molecular equivalent of a member of the class consisting of 4,4'-diaminostilbene-2,2'-disulphonic acid and 3,3-dichlorobenzidine.

5. A stable blue writing ink comprising an aqueous solution of a caustic alkali and the dye consisting at least predominantly of a compound of the structure

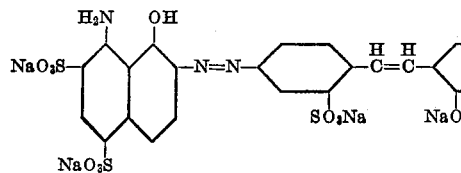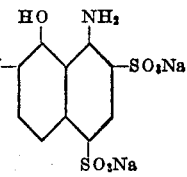

which dye is produced by coupling tetrazotized 4,4'-diaminostilbene-2,2'-disulphonic acid two molecular equivalents of 1-amino-8-naphthol-2,4-disulphonic acid.

6. A stable blue writing ink comprising an aqueous solution of a caustic alkali and the dye consisting at least predominantly of a compound of the structure

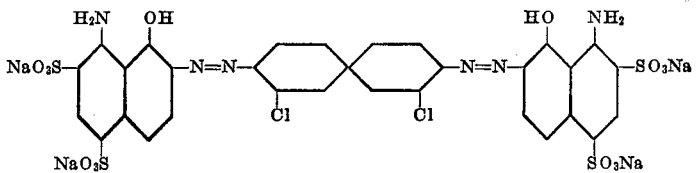

which dye is produced by coupling tetrazotized 3,3'-dichlorobenzidine with two molecular equivalents of 1-amino-8-naphthol-2,4-disulphonic acid.

WILLIAM B. REYNOLDS.

REFERENCES CITED

The following references are of record in the file of this patent:

UNITED STATES PATENTS

| Number | Name | Date |
|---|---|---|
| 498,874 | Bamman | June 6, 1893 |
| 511,532 | Kothe | Dec. 26, 1893 |
| 539,699 | Moeller | May 21, 1895 |
| 594,123 | Rudolph | Nov. 23, 1897 |

FOREIGN PATENTS

| Number | Country | Date |
|---|---|---|
| 540,455 | Great Britain | Oct. 17, 1941 |

OTHER REFERENCES

Schultz: "Farbstoff Tabellen," 7th ed., vol. 1, page 177.

Certificate of Correction

Patent No. 2,489,463 November 29, 1949

WILLIAM B. REYNOLDS

It is hereby certified that errors appear in the printed specification of the above numbered patent requiring correction as follows:

Column 1, line 24, after the word "edition" insert *#424 7th edition*; line 34, for "4,4'-diamino-stilbene-" read *4,4'-diaminostilbene-*; column 4, line 4, for "naphthol-4-6-" read *naphthol-4,6-*; line 6, for "4,4-diaminostilbene-" read *4,4'-diaminostilbene-*; lines 21 and 22, strike out "molecular"; same line 22, for "equivalent" read *equivalents*; line 72, for "3,3-" read *3,3'*;

and that the said Letters Patent should be read with these corrections therein that the same may conform to the record of the case in the Patent Office.

Signed and sealed this 18th day of April, A. D. 1950.

[SEAL]

THOMAS F. MURPHY,
*Assistant Commissioner of Patents.*